(12) United States Patent
Cheong et al.

(10) Patent No.: US 8,396,102 B2
(45) Date of Patent: Mar. 12, 2013

(54) TRANSMITTER AND RECEIVER FOR GIGA-BPS HIGH-THROUGHPUT WIRELESS COMMUNICATION SYSTEM WITH MULTIPLE ANTENNAS AND MULTIPLE BANDS

(75) Inventors: Minho Cheong, Daejeon (KR); Yu-Ro Lee, Daejeon (KR); Jong-Ee Oh, Daejeon (KR); Sok-Kyu Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 261 days.

(21) Appl. No.: 12/808,179

(22) PCT Filed: Nov. 28, 2008

(86) PCT No.: PCT/KR2008/007064

§ 371 (c)(1),
(2), (4) Date: Jun. 14, 2010

(87) PCT Pub. No.: WO2009/078599

PCT Pub. Date: Jun. 25, 2009

(65) Prior Publication Data

US 2010/0260246 A1     Oct. 14, 2010

(30) Foreign Application Priority Data

Dec. 15, 2007   (KR) ......................... 10-2007-0131835
Aug. 13, 2008   (KR) ......................... 10-2008-0079630

(51) Int. Cl.
*H04B 1/38* (2006.01)

(52) U.S. Cl. ........ 375/220; 375/219; 375/267; 375/295; 375/299; 375/316; 375/347; 455/39; 455/73; 455/91; 455/101; 455/130; 455/132; 455/500; 455/562.1; 370/272; 370/273; 370/276; 370/297; 370/334; 370/335

(58) Field of Classification Search ................... 375/219, 375/220, 267, 295, 299, 316, 347; 455/39, 455/73, 91, 101, 130, 132, 500, 562.1; 370/272, 370/273, 276, 297, 334, 335
See application file for complete search history.

(56) References Cited

U.S. PATENT DOCUMENTS 7,133,646  B1    11/2006  Miao
(Continued)

FOREIGN PATENT DOCUMENTS

KR    1020050043297 A    5/2005
WO    WO 2004/102913 A1    11/2004

OTHER PUBLICATIONS

W. Pam Siriwongpairat et al., "Multiband-OFDM MIMO Coding Framework for UWB Communication System", IEEE Transactions on Signal Processing, Jan. 2006, pp. 214-224, vol. 54 No. 1, IEEE.
Dr Anil Shukla et al., "A Study for the Provision of Aggregation of Frequency to Provide Wider Bandwidth Services", QinetiQ Proprietary, Aug. 2006, pp. i-xvi & pp. 1-188, QinetiQ ltd.

(Continued)

*Primary Examiner* — Leon Flores

(57) ABSTRACT

Provided is a transmitter and a receiver for a high-throughput wireless communication system. The transmitter includes a baseband transmitter, a DIF transmitter, and a RF transmitter. The baseband transmitter performs a MAC protocol process on transmission signals and reception signals and processes the transmission signals by dividing an entire transmission band into n bands in a physical layer process of the transmission data, where n is a natural number. The DIF transmitter combines transmission signals of each band from the baseband transmitter and outputs m channel signals corresponding to a number of transmission antennas, where m is a natural number. The RF transmitter modulates each of the channel signals transferred from the DIF transmitter and transmits the modulated signals through m antennas.

8 Claims, 14 Drawing Sheets

U.S. PATENT DOCUMENTS

| | | | |
|---|---|---|---|
| 7,233,773 B2 * | 6/2007 | Hansen et al. | 455/69 |
| 7,263,133 B1 | 8/2007 | Miao | |
| 7,269,430 B2 * | 9/2007 | Moorti et al. | 455/458 |
| 2005/0128936 A1 | 6/2005 | Shao | |
| 2009/0154427 A1 * | 6/2009 | Lee et al. | 370/335 |

OTHER PUBLICATIONS

International Search Report for PCT/KR2008/007064 filed on Nov. 28, 2008.

Written Opinion of the International Searching Authority for PCT/KR2008/007064 filed on Nov. 28, 2008.

* cited by examiner

Fig. 5
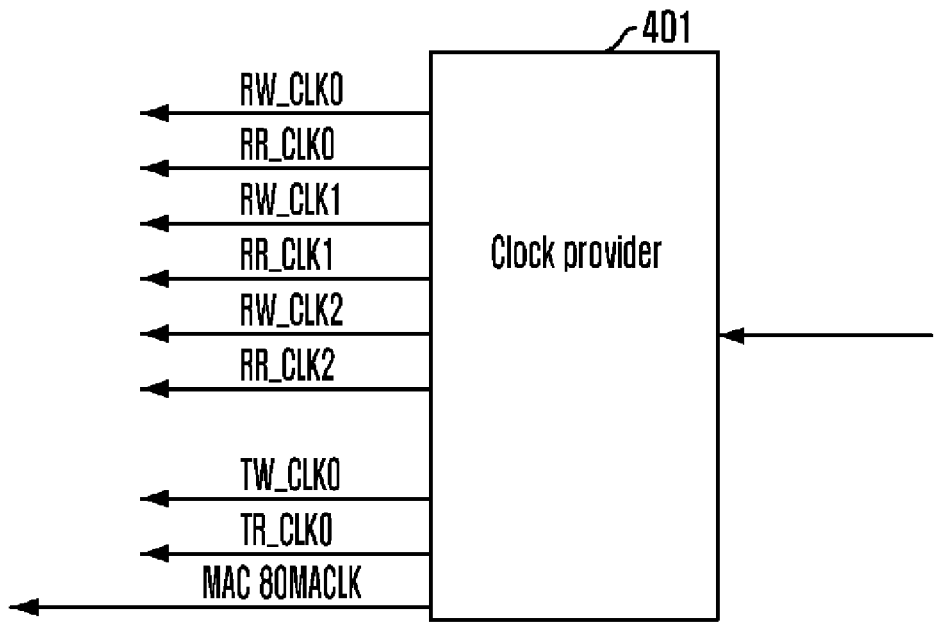
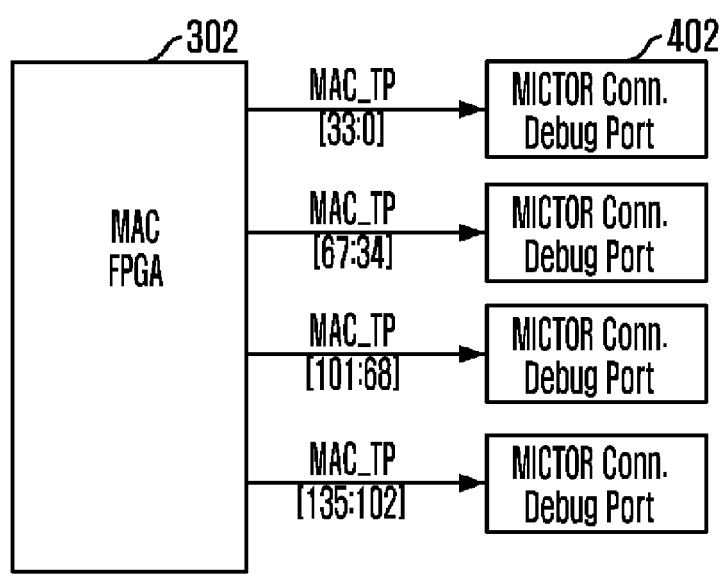

Fig. 6
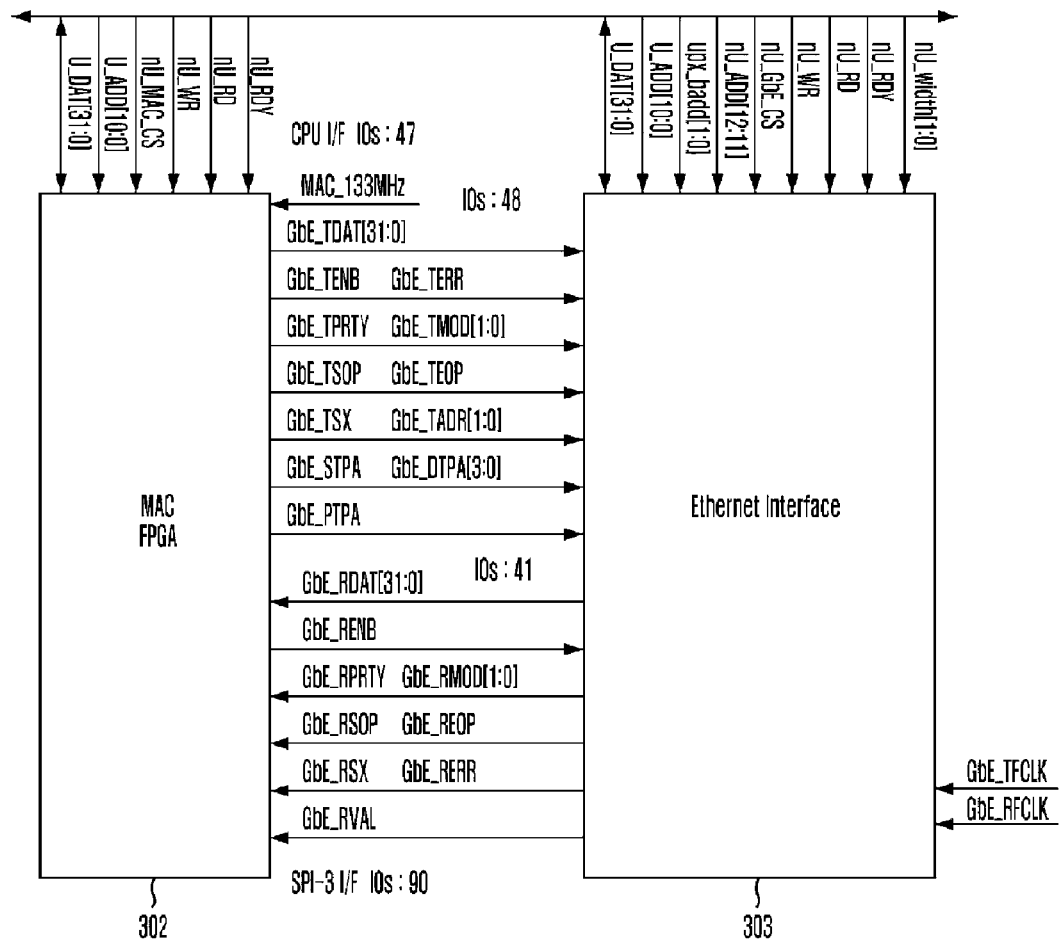
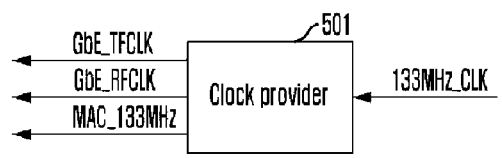

Fig. 8
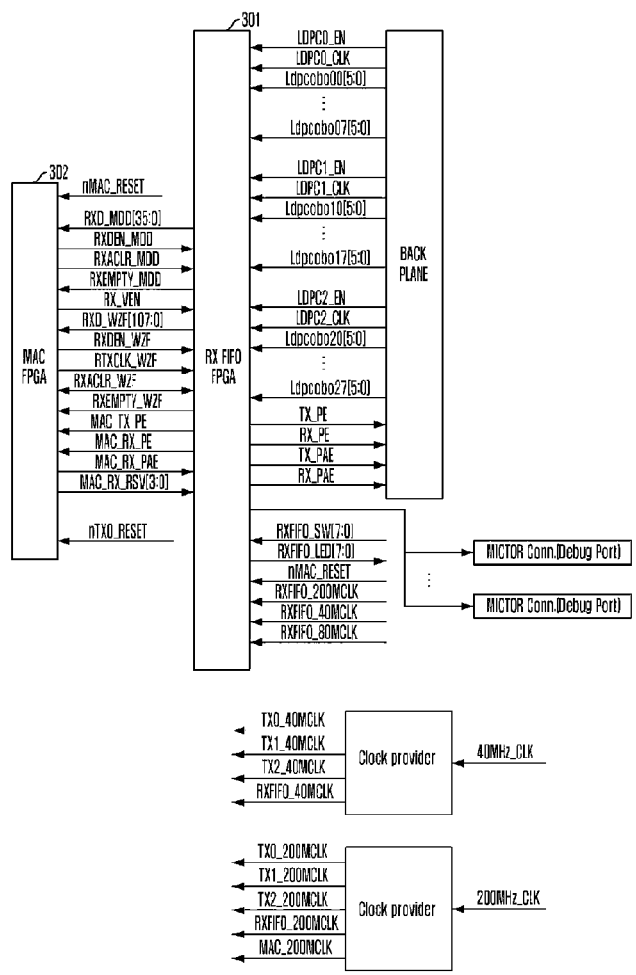
[Fig. 9]
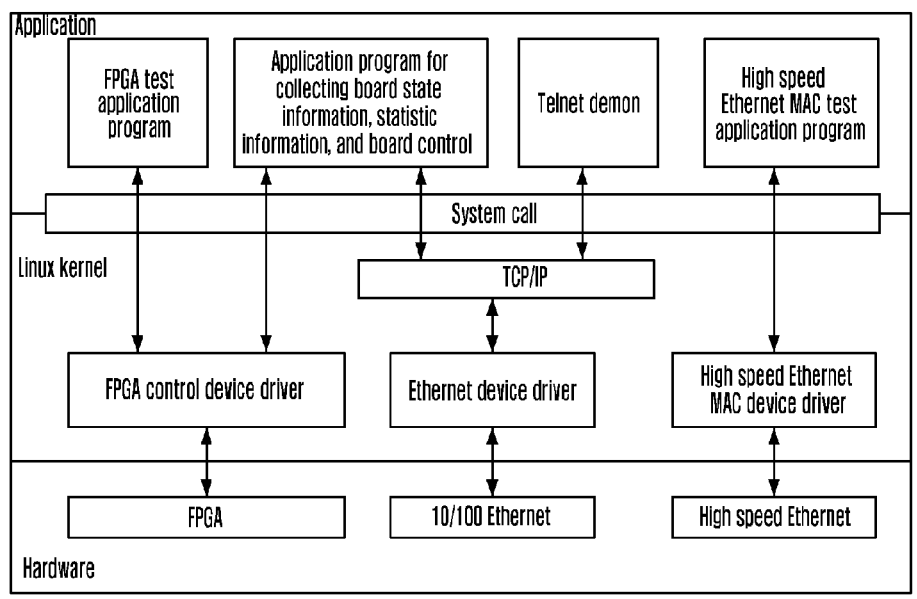

TRANSMITTER AND RECEIVER FOR GIGA-BPS HIGH-THROUGHPUT WIRELESS COMMUNICATION SYSTEM WITH MULTIPLE ANTENNAS AND MULTIPLE BANDS

TECHNICAL FIELD

The present invention relates to a transmitter and a receiver for a high-throughput wireless communication system using multiple antennas; and, more particularly, to a transmitter and a receiver for improving a transmission rate of a high-throughput wireless communication system while reducing an error rate thereof by dividing a transmission band into a plurality of bands in order to process signals of multiple channels and improve frequency efficiency in a high-throughput wireless communication system using multiple antennas for high speed data transmission.

This work was supported by the IT R&D program of MIC/IITA [2006-S-002-02, "IMT-Advanced Radio Transmission Technology with Low Mobility"].

BACKGROUND ART

The next generation wireless local area network (LAN) can provide a high speed multimedia service to terminals such as a notebook computer, a personal computer, and a portable digital assistant (PDA) at a transmission rate of 200 Mbps within a 100 m radius. Also, the next generation wireless LAN can provide a wireless network environment for Hot-spot, Office Networking, and home networking.

Lately, a wireless LAN technology has been popularly used to provide a wireless Internet service in predetermined public areas such as an airport, a hotel, and a cafe. Particularly, it has been enabled to form a wireless home network in home in a form of a wireless LAN system combined with a broadband wired subscriber loop network such as Asymmetry Digital Subscribe Loop (ADSL) in South Korea.

In 1999, the standards for 2.4 GHz band of IEEE 802.11b and for 5 GHz band of IEEE 802.11a were defined. After that, 802.11b systems have been commercialized and the wireless LAN has been popularized. At the initial stage, the wireless LAN was provided as a private network without a service provider. Since 2002, a public network service has been provided in predetermined nations such as South Korea and U.S.A. Lately, the range of the public network service has been continuously extending. Since products related to IEEE 802.11a and IEEE 802.11g have come out on a market, data can be transmitted at 54 Mbps.

Recently, an IEEE 802.11n task group has been discussing a pane for increasing the maximum throughput of a medium access control (MAC) layer higher than 100 Mbps rather than increasing the throughput of a physical layer.

In other words, not only the physical layer but also the MAC layer has been carefully studied to improve the throughput. In order to improve the throughput, a Multiple Input Multiple Output (MIMO) system for improving frequency efficiency using multiple antennas, a method for improving a bandwidth, and an adaptive modulation have been researched.

The MIMO system forms a plurality of independent fading channels at a transmitter using multiple antennas and transmits different signals through the multiple transmission antennas simultaneously, thereby significantly improving a data transmission speed. Accordingly, the MIMO system can transmit a further large amount of data even without expanding a frequency.

However, the MIMO system has a drawback that the MIMO system is weak to interference between symbols and frequency selective fading. In order to overcome the drawback, an Orthogonal Frequency Division Multiple (OFDM) scheme has been used together. The OFDM scheme is a modulation scheme most suitable for high speed data transmission. The OFDM scheme transmits data through a sub-carrier having a data transmission rate lower than one data row.

By combining the MIMO system with the OFDM system, the drawback of the MIMO system can be attenuated using the OFDM system without eliminating the advantageous of the MIMO system. The MIMO system generally includes N transmission antennas and M reception antennas, and a MIMO-OFDM system is a typical MIMO system employing an OFDM technology.

However, the MIMO system has following shortcomings. The MIMO system needs at least two or three transmission antennas and reception antennas. Also, the MIMO system cannot expands a bandwidth wider than 40 MHz and has a limited channel capacity such as a several mega transmission speed. Lately, a very high-throughput (VHT) task group has been discussing about a Giga level wireless communication system. It has been required to develop a system having a wide bandwidth in a high speed wireless LAN technology using the MIMO system.

DISCLOSURE OF INVENTION

Technical Problem

An embodiment of the present invention is directed to providing a transmitter and a receiver for improving a transmission rate of a high-throughput wireless communication system while reducing an error rate thereof by dividing a transmission band into a plurality of bands in order to process signals of multiple channels and improve frequency efficiency in a high-throughput wireless communication system using multiple antennas for high speed data transmission.

Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

Technical Solution

In accordance with an aspect of the present invention, there is provided a transmitting apparatus of a high high-throughput wireless communication system using multiple antennas, including a baseband transmitter, a digital intermediate frequency (DIF) transmitter, and a RF transmitter. The baseband transmitter performs a medium access control (MAC) protocol process on transmission signals and reception signals and processes the transmission signals by dividing an entire transmission band into n bands in a physical layer process of the transmission data, where n is a natural number. The DIF transmitter combines transmission signals of each band from the baseband transmitter and outputs m channel signals corresponding to a number of transmission antennas, where m is a natural number. The RF transmitter modulates each of the channel signals transferred from the DIF transmitter and transmits the modulated signals through m antennas.

In accordance with another aspect of the present invention, there is provided a receiving apparatus of a high high-throughput wireless communication system using multiple antennas, including a radio frequency (RF) receiver, a digital intermediate frequency (DIF) receiver, and a plurality of baseband receivers. The RF receiver down-converts RF signals received through a plurality of antennas, and the DIF receiver divides m channel signals of an entire band inputted from the RF receiver into signals of n bands and outputting the divided signals of n bands. The plurality of baseband receivers receives the divided signals from the digital intermediate frequency receiver and restores data through a physical layer process, multiple signal detection, and channel decoding.

Advantageous Effects

A high-throughput wireless communication system according to the present invention can transmit eight streaming signals at the same time using more than eight multiple antennas, which were not implemented in a multiple input multiple output (MIMO) system. Therefore, a transmission speed can be significantly improved. Also, the high-throughput wireless communication system according to the present invention can process a signal by dividing a transmission band into a plurality of bands. Therefore, it is possible to use a modulation scheme having a low error rate and to remove interference between channels.

BRIEF DESCRIPTION OF THE DRAWINGS

FIGS. 4 and 5 are diagrams illustrating an interface between a MAC FPGA and a

DPRAM in accordance with an embodiment of the present invention.

FIG. 6 is a diagram illustrating an interface between a MAC FPGA and an Internet interface in accordance with an embodiment of the present invention.

Figure 7:
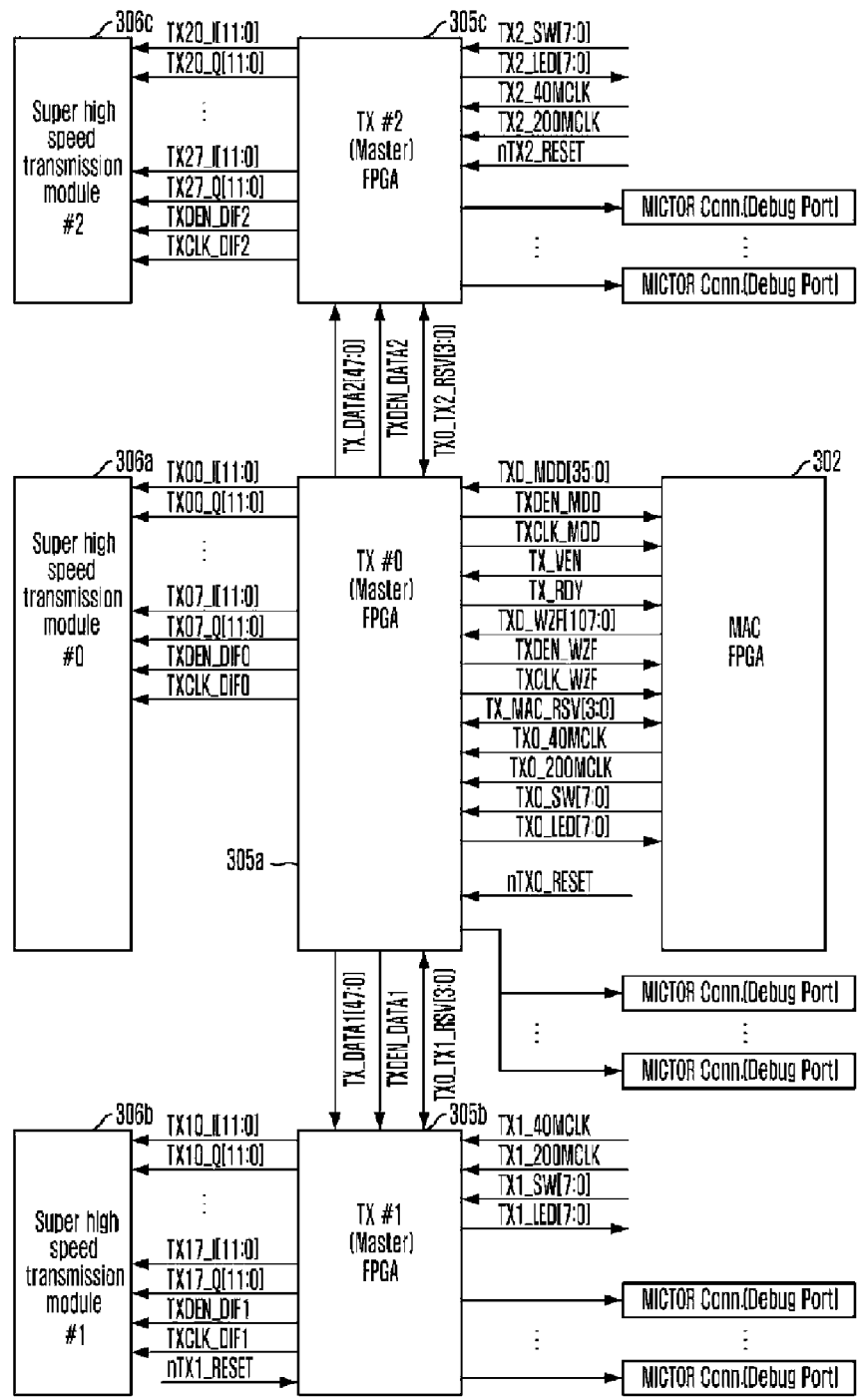

FIGS. 7 and 8 are diagrams illustrating an interface structure between an MAC controller (MAC FPGA) and transmission processing modules (Tx FPGA) and an interface structure between transmission processing modules and super high speed transmission modules.

FIG. 9 is a block diagram illustrating a software structure of a master board in accordance with an embodiment of the present invention.

Figure 10:
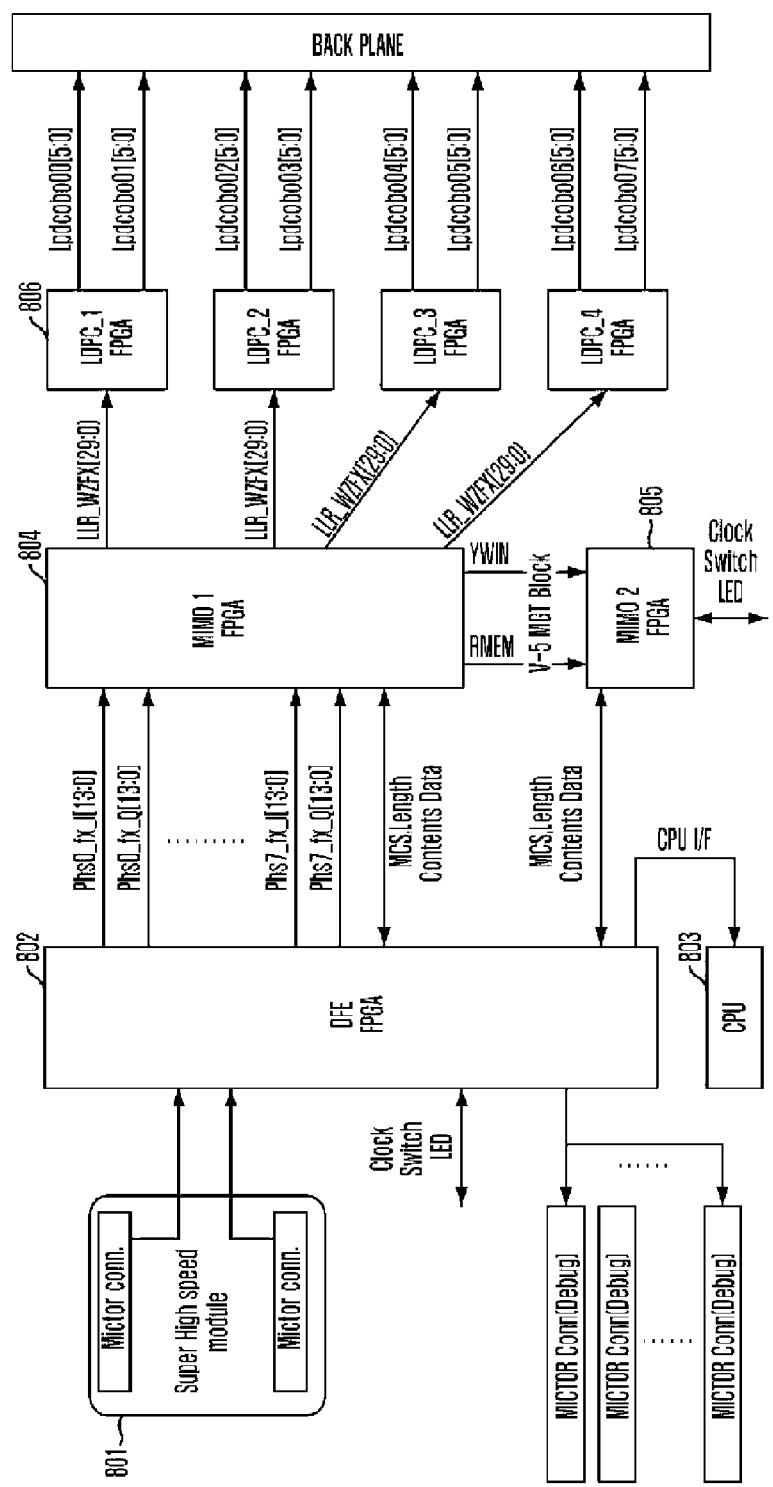

FIG. 10 is a diagram illustrating a baseband receiving board (DML) in accordance with an embodiment of the present invention.

Figure 11:
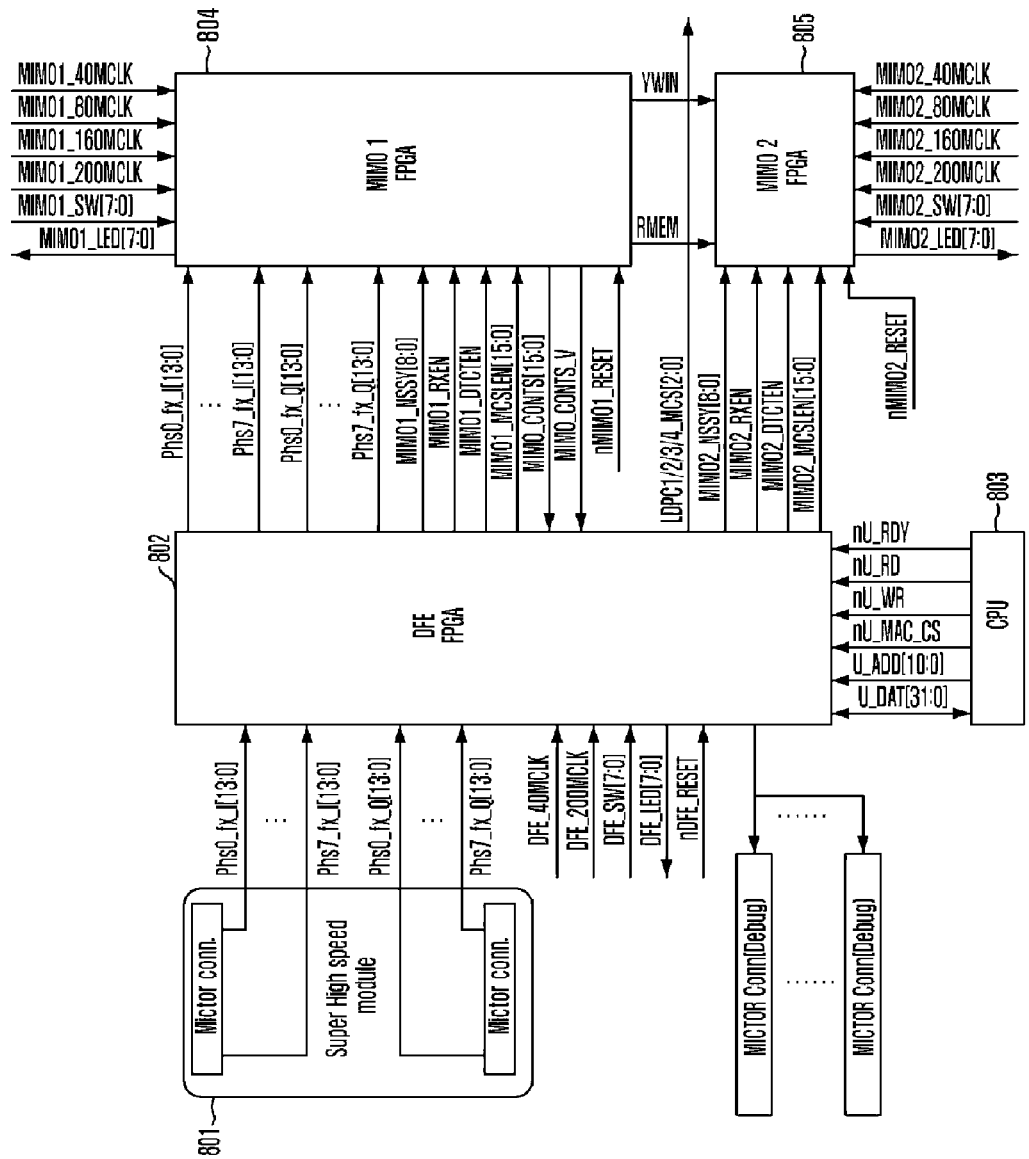
Figure 12:
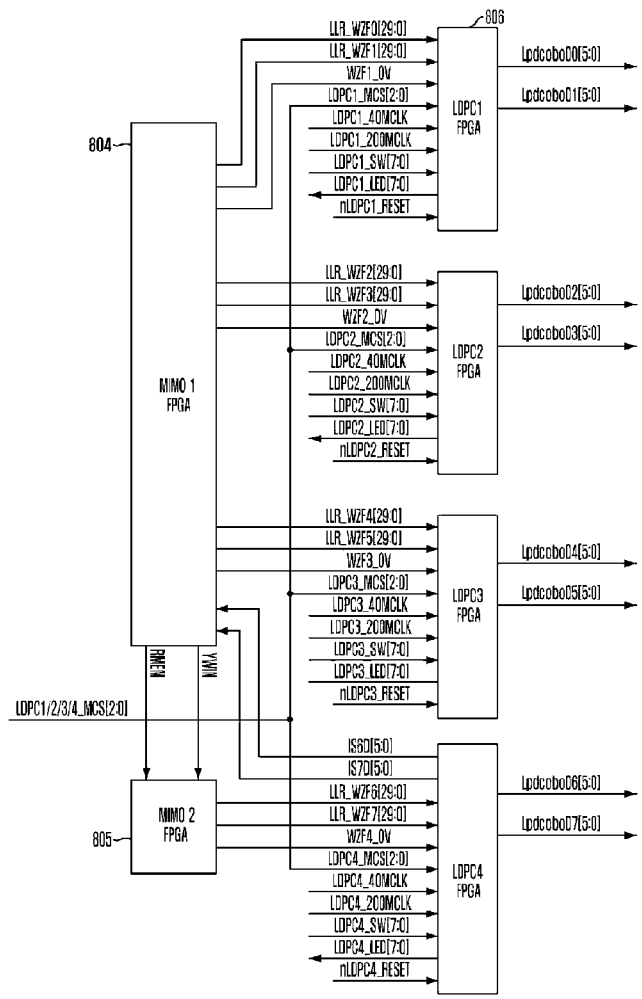

FIGS. 11 and 12 are diagrams for describing an interface of a baseband receiving board (DML).

Figure 13:
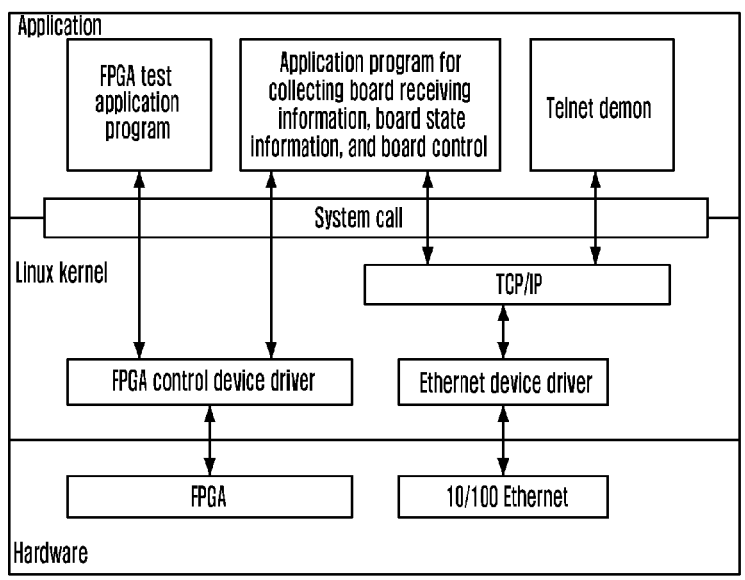

FIG. 13 is a diagram illustrating software driven on a baseband receiving board (DML) in accordance with an embodiment of the present invention.

Figure 14:
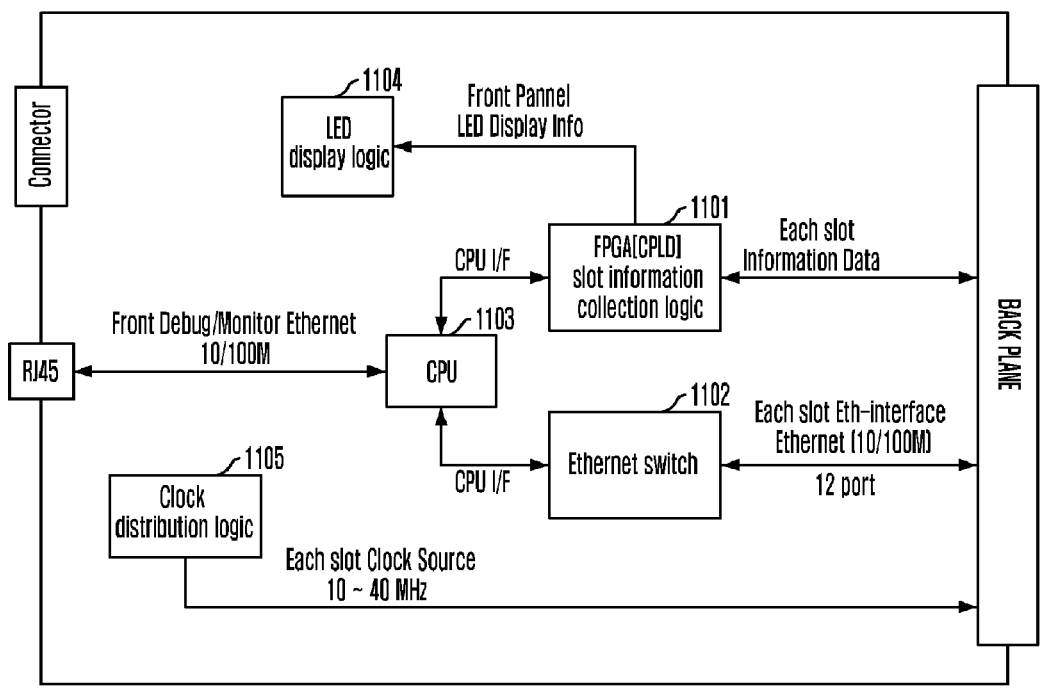

FIG. 14 is a diagram illustrating a control board in accordance with an embodiment of the present invention.

Figure 15:
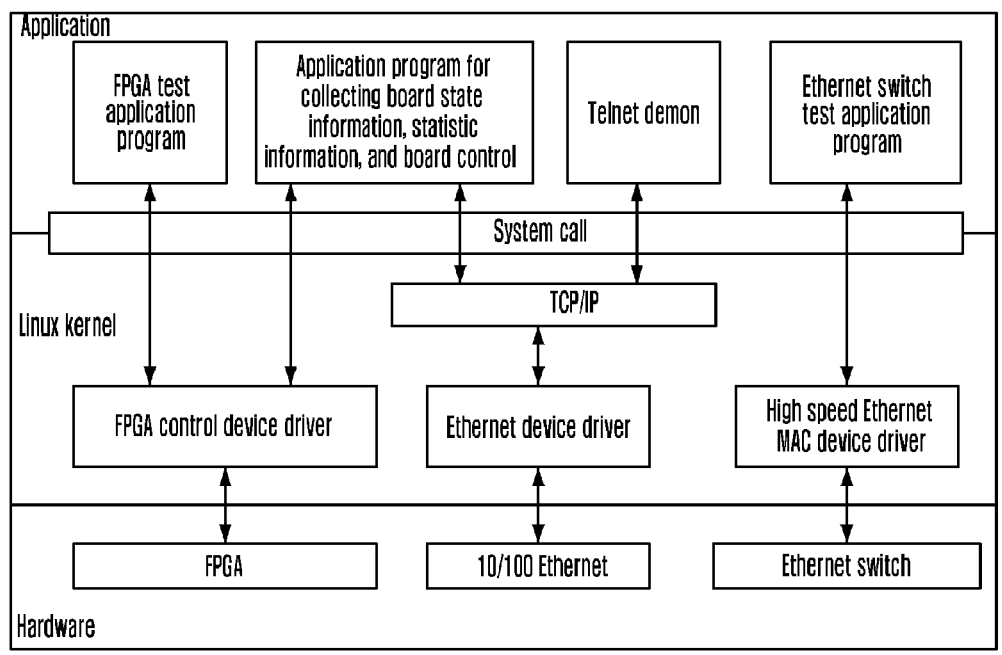

FIG. 15 is a diagram illustrating software of a control board in accordance with an embodiment of the present invention.

Figure 16:
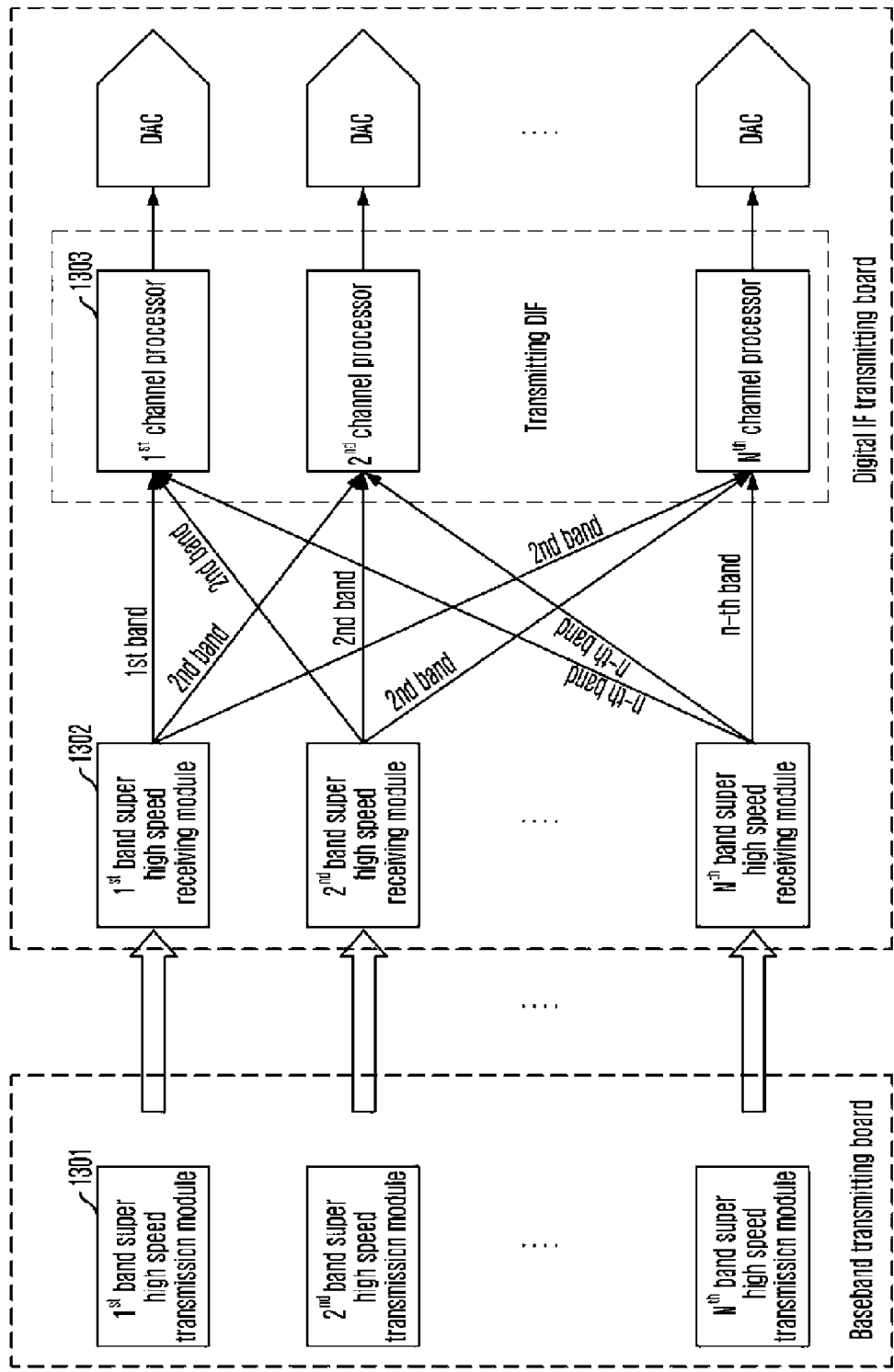

FIG. 16 is a diagram for describing signal transmission between a physical layer processor of a baseband transmitting side and a digital intermediate frequency (DIF) transmission board in accordance with an embodiment of the present invention.

Figure 17:
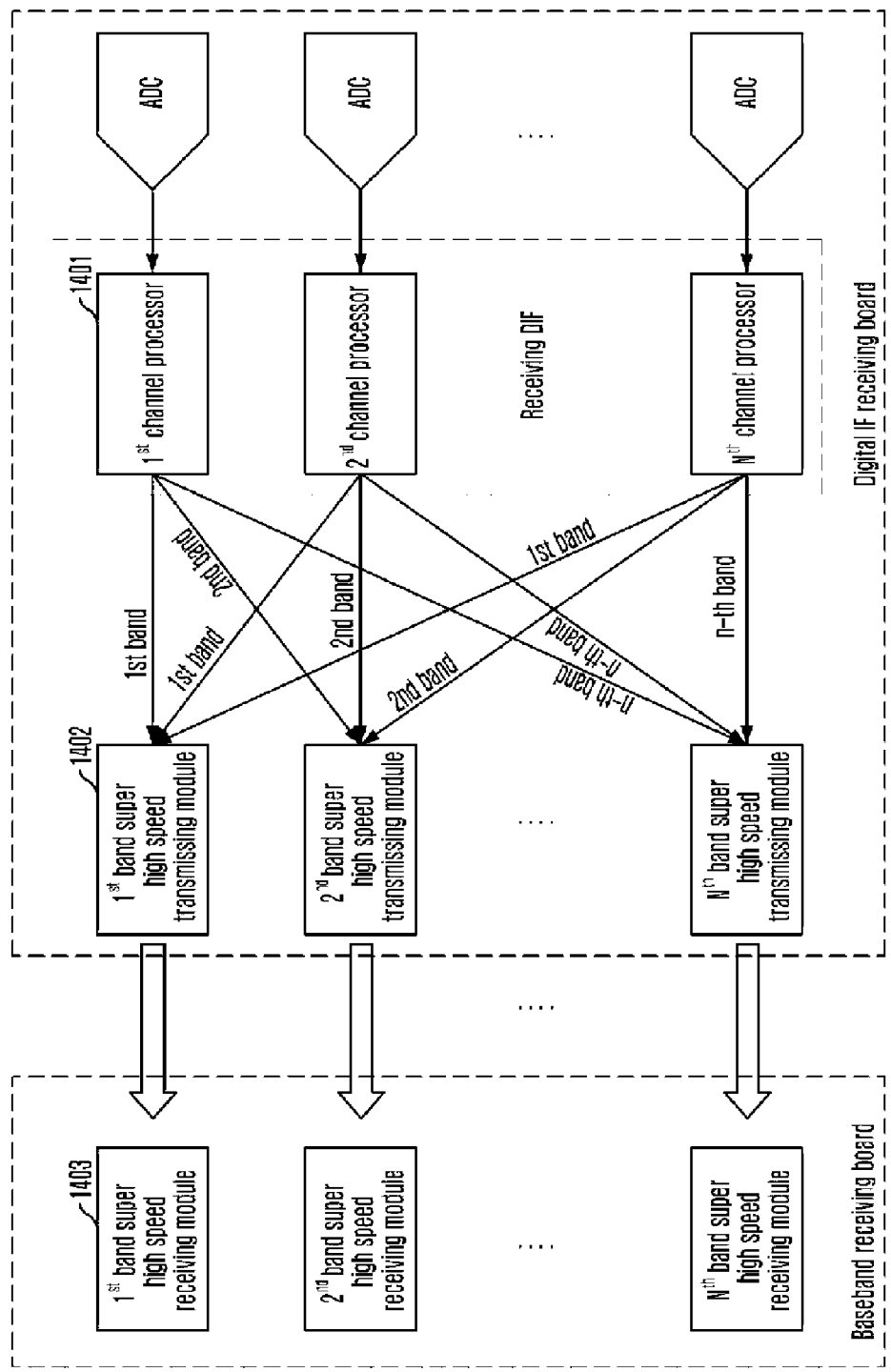

FIG. 17 is a diagram for describing signal transmission between a digital intermediate frequency (DIF) receiving board and a baseband receiving board in accordance with an embodiment of the present invention.

BEST MODE FOR CARRYING OUT THE INVENTION

The advantages, features and aspects of the invention will become apparent from the following description of the embodiments with reference to the accompanying drawings, which is set forth hereinafter.

Figure 1:
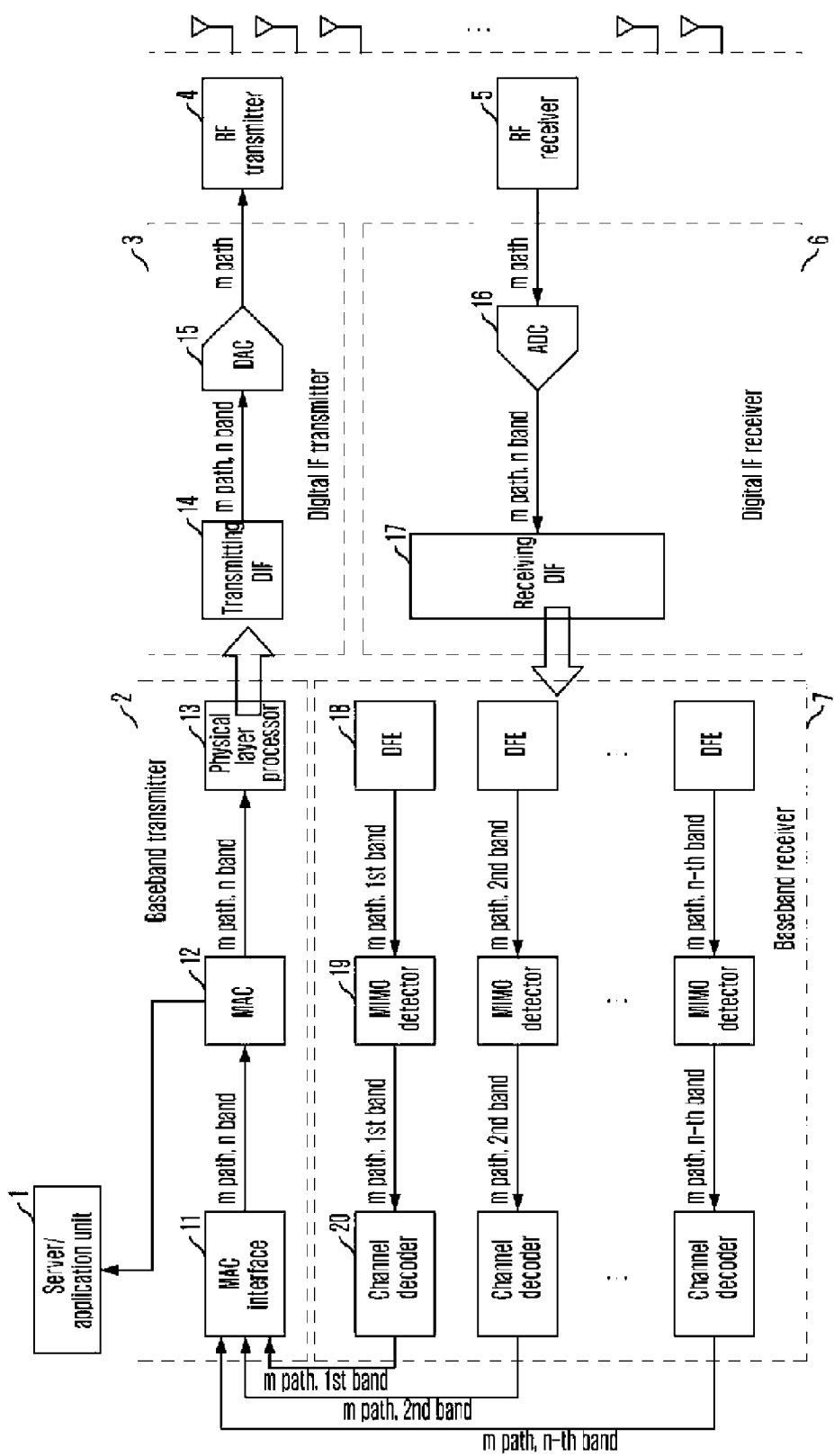
FIG. 1 is a block diagram illustrating a high-throughput wireless communication system using an Orthogonal Frequency Division Multiple (OFDM) scheme with multiple antennas in accordance with an embodiment of the present invention.

FIG. 1 is a block diagram illustrating a high-throughput wireless communication system using an Orthogonal Frequency Division Multiple (OFDM) scheme with multiple antennas in accordance with an embodiment of the present invention.

The wireless communication system according to the present embodiment uses more than eight antennas. Digital intermediate frequency (DIF) transmitter and receiver of the wireless communication system according to the present embodiment divide an entire transmission bandwidth into a plurality of bandwidths, for example, by 40 MHz, or combine the plurality of divided bandwidths. Accordingly, the wireless communication system according to the present invention processes data of the divided 40 MHZ bandwidths at a baseband receiver and transmits data of 40 MHz-times of bandwidths, for example, 80 MHz or 120 MHz, at a radio frequency (RF) transmitter. Also, the high-throughput wireless communication system according to the present embodiment uses a several tens Giga byte level high speed interface between the DIF transmitter/receiver and the baseband transmitter/receiver in order to reduce the number pins between baseband chips and transmit data with high reliability.

The high-throughput wireless communication system according to the present embodiment includes four layers. That is, the high-throughput wireless communication system includes a server/application unit 1 for outputting audio and video contents on a terminal, baseband transmitter and receiver 2 and 7 for modulating data from the server/application unit 1 into reliable data and demodulating a received baseband signal and transferring the demodulated data into the server/application unit 1, Digital Intermediate Frequency (DIF) transmitter and receiver 3 and 5 for receiving and converting the baseband digital signal into an analog signal and receiving and converting an analog signal to a digital signal, and Radio Frequency (RF) transmitter and receiver 4 and 5 for modulating and demodulating a radio frequency signal.

The baseband transmitter 2 includes a Medium Access Control (MAC) unit 12 for transmitting audio and video data based on a communication protocol, a physical layer processor 13 for performing a digital modulation on a packet data from the MAC unit 12 in order to process a signal at a high speed, and a MAC interface 11 for transferring data from the baseband receiver 7 to the MAC unit 12.

The baseband receiver 7 includes a Digital Front Ed (DFE) 18 for receiving digital signals of each bandwidth, synchronizing the received digital signals, and converting a frequency domain signal to a time domain signal, an Multiple Input Multiple Output (MIMO) detector for detecting symbols of the output signal of the DFE 18 through QR decomposition and multidimensional detection, and a channel decoder 20 for restoring data by decoding the detected symbols from the MIMO detector 19 through channel decoding. Here, the channel decoder 20 may be a Low Density Parity Check (LDPC) decoder.

The MAC unit 12 generates a header for the data transferred from the server/application unit 1 according to a predetermined protocol, attaches the generated header before the data, and also attaches a Cyclic Redundancy Checking (CRC) code after the data. Such an MAC frame having the header and the CRC code is transferred to the physical layer processor 13.

In general, the physical layer processor 13 includes a scrambling unit for mixing data patterns to reduce an error by a Peak to Average Power Ratio (PAPR), a channel coder for restoring an error generated at a channel, an interleaving unit for receiving error for consecutive errors, an Inverse Fast Fourier Transform (IFFT) unit for effectively transmitting data at a high speed, and a modulator and a filter for increasing a data transmission speed. The physical layer processor 13 transfers a signal modulated based on an OFDM scheme to the DIF transmitter 14.

The DIF transmitter 14 receives baseband signals which are divided into a plurality of bands, for example, by 40 MHz, from the physical layer processor 13 through a high speed interface, combines baseband signals by each band, and modulates the combined baseband signals into a plurality of channels. The DIF transmitter 14 modulates it into a low intermediate frequency (IF). The operation of the DIF transmitter will be described in more detail in later. The Digital to Analog Converter (DAC) 15 converts digital signals which are modulated to each channel by the DIF transmitter 14 into analog signals and transfers the analog signals to the RF transmitter 4.

The RF transmitter modulates the analog signals from the DAC 15 into radio frequency signals and transmits the RF signals through a plurality of antennas.

The RF receiver 5 down-converts signals inputted through a plurality of antennas into Zero IF signals. Here, the RF receiver 5 may convert the received RF signal directly into a baseband signal without converting into an IF signal in order to simplify a structure of the RF receiver.

The Analog to Digital Converter (ADC) 16 converts the analog baseband signals of each channel inputted from the RF receiver 15 into digital signals and provides the digital signals to the DIF receiver 17.

The DIF receiver 17 divides the baseband signals inputted by 40 MHz band times into a plurality of 40 MHz bands and provides the divided signals into a Digital Front End (DFE) through a high speed communication module. The operation of the DIF receiver 17 will be described in more detail in later.

The DFE 18 performs physical layer processing operations such as gain control, synchronization, and Fast Fourier Transform (FFT) for the signals of each band from the DIF receiver 17. That is, the DFE 18 removes direct current (DC) components generated on a board, compensates a gain of a Q channel based on an I channel value or a phase offset, and synchronizes symbols based on correlation between a short preamble and a long preamble. The DFE 18 corrects a frequency offset based on a phase offset calculated by a long preamble and converts a frequency domain signal into a time domain signal through FFT. Also, the DFE 18 compensates a phase offset estimated using a pilot signal and corrects a signal distorted by a channel by equalizing data obtained through FFT based on a channel estimation value through a long preamble.

The MIMO detector 19 detects symbols of the signals of each band from the DRF 18 through QR decomposition and multidimensional detection. The channel decoder 20 restores data by performing channel decoding on the detected symbols from the MIMO detector 19.

After a CRC code detector confirms that the received signal does not include any error, the restored data packet is transferred to the MAC unit 12 through the MAC interface 11. The MAC unit 12 extracts information of a header from the data packet and transfers the received data to the server/application unit 1.

Figure 2:
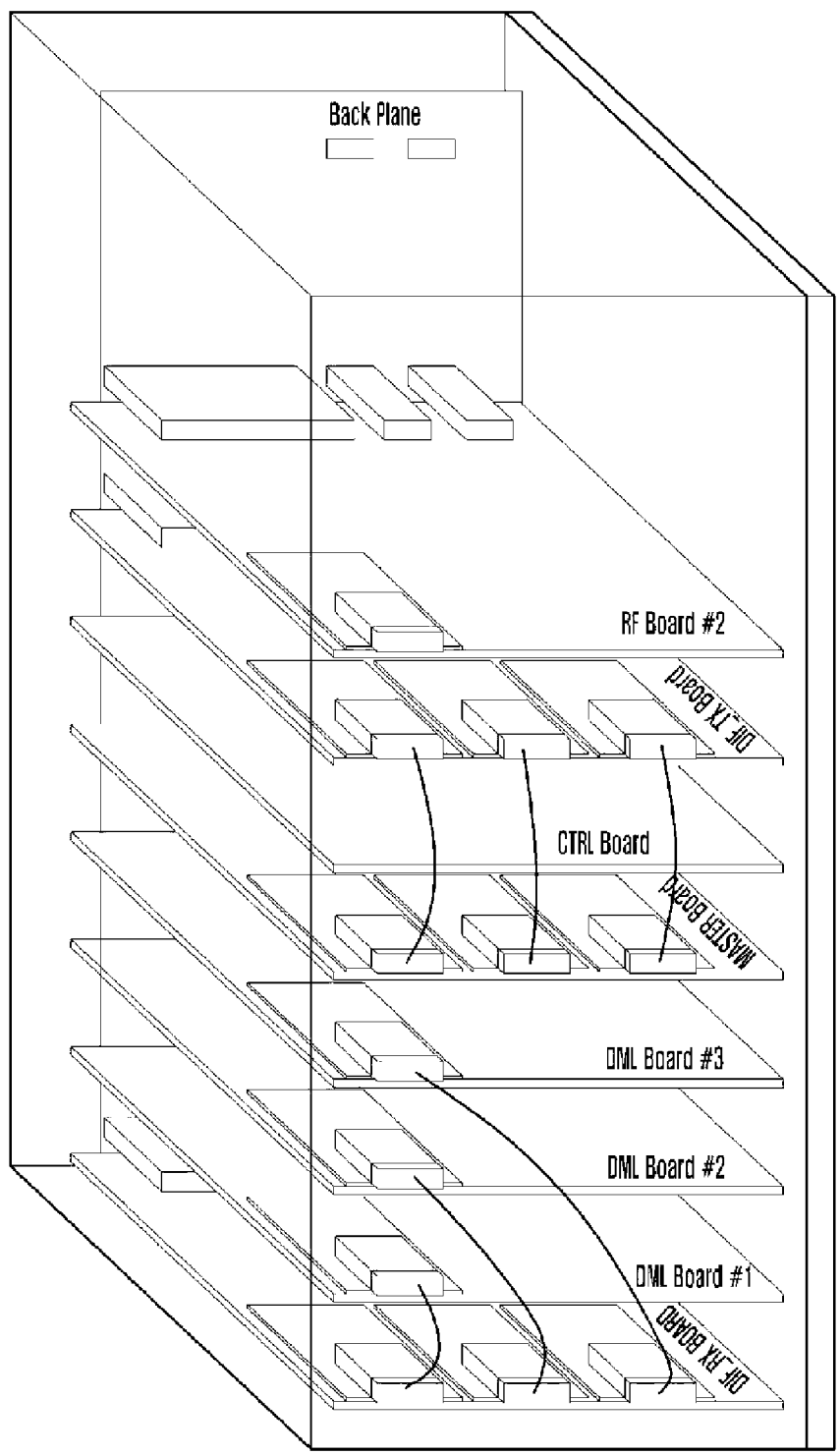
FIG. 2 is a diagram illustrating an implementation example of a high-throughput wireless communication system in accordance with an embodiment of the present invention.

FIG. 2 is a diagram illustrating an implementation example of a high-throughput wireless communication system in accordance with an embodiment of the present invention.

As shown in FIG. 2, the high-throughput wireless communication system according to the present embodiment basically includes a baseband module, a Digital Intermediate Frequency (DIF) module DIF_TX Board and DIF_RX Board, and a Radio Frequency (RF) module. The baseband module includes a master board MASTER, three baseband receiver boards (DML: DFF-MIMO-LDPC) #1 to #3, a control board CTRL Board. Although three baseband receiver boards DML are included in the present embodiment, the present invention is not limited thereto. The number of the baseband receiver boards may be changed if it is necessary.

Figure 3:
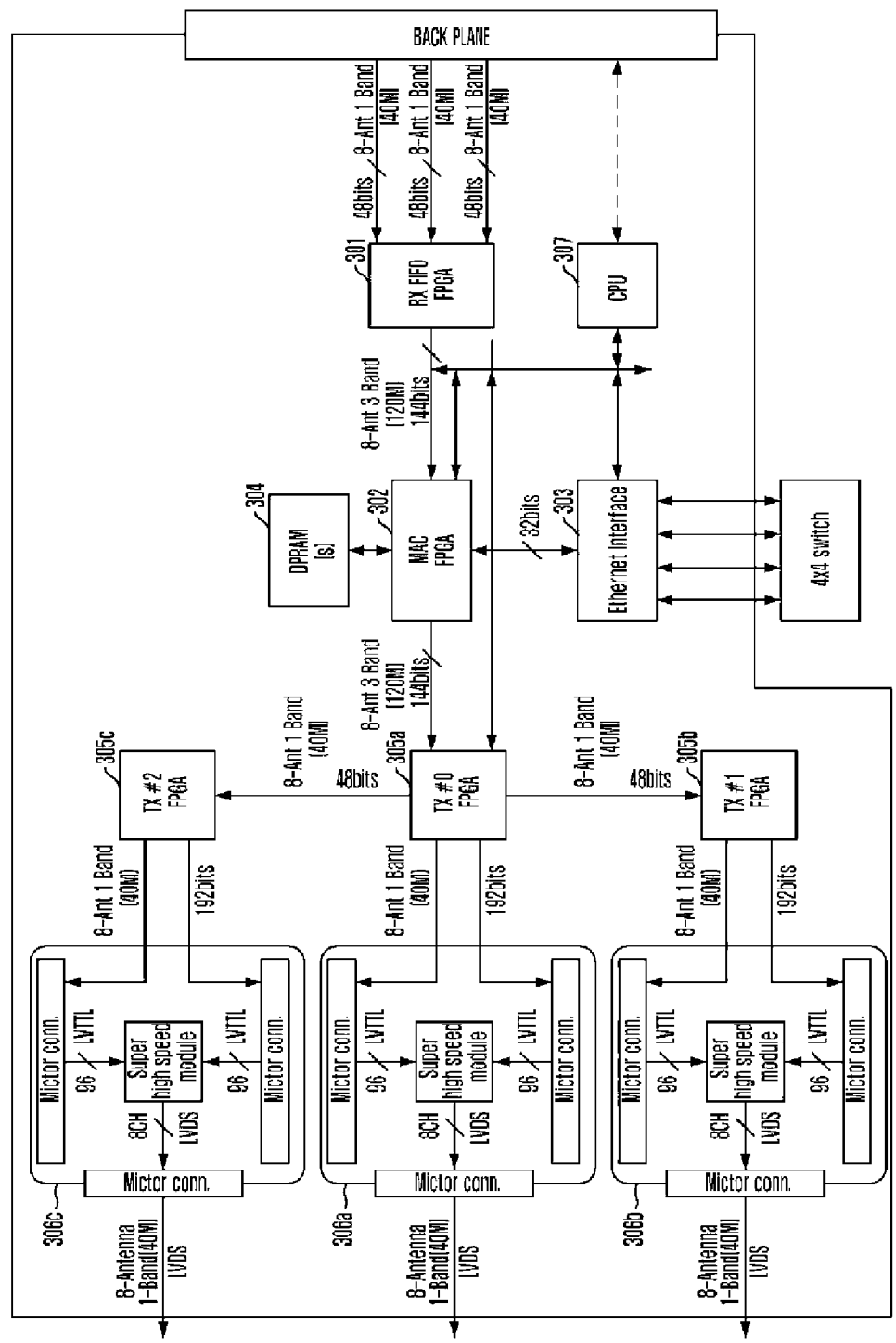
FIG. 3 is a diagram illustrating a master board in accordance with an embodiment of the present invention.

FIG. 3 is a diagram illustrating a master board in accordance with an embodiment of the present invention. Hereinafter, the operation of the master board will be described based on a receiving operation and a transmitting operation with reference to FIG. 3.

In the receiving operation, the master board receives data packets from the three baseband receiver boards (DML) at a speed of 1.2 G through a back plane. The received data packets are temporally stored in a receiving buffer (Rx FIFO FPGA) 301. The packets stored in the receiving buffer 301 may be provided to an external server through a Giga Ethernet interface 303 after the packets are processed by a MAC controller (MAC FPGA) 302. The receiving buffer 301 of FIG. 3 is equivalent to the MAC interface 11 of FIG. 1.

Referring to FIG. 3, the back plane and the receiving buffer (Rx FIFO FPGA) 301 are connected through 48-bits of signals. The signals connected at each of the baseband receiver boards DML include a data enable signal Data Enable, a data clock Data Clock, and data buses Ant#0(0:5) to Ant#7(0:5).

The MAC controller (MAC FPGA) 302 is connected to the receiving buffer (Rx FIFO FPGA) 301 through a control signal for confirming the data temporally stored in the Rx FIFO FPGA 301 and a Data Bus for reading the temporally stored data. The MAC FPGA 302 receives 144-bit of Data Bus from the Rx FIFO FPGA 301 as an input signal and processes data received through a DPRMA 304 and a Giga Internet interface 303.

Figure 4:
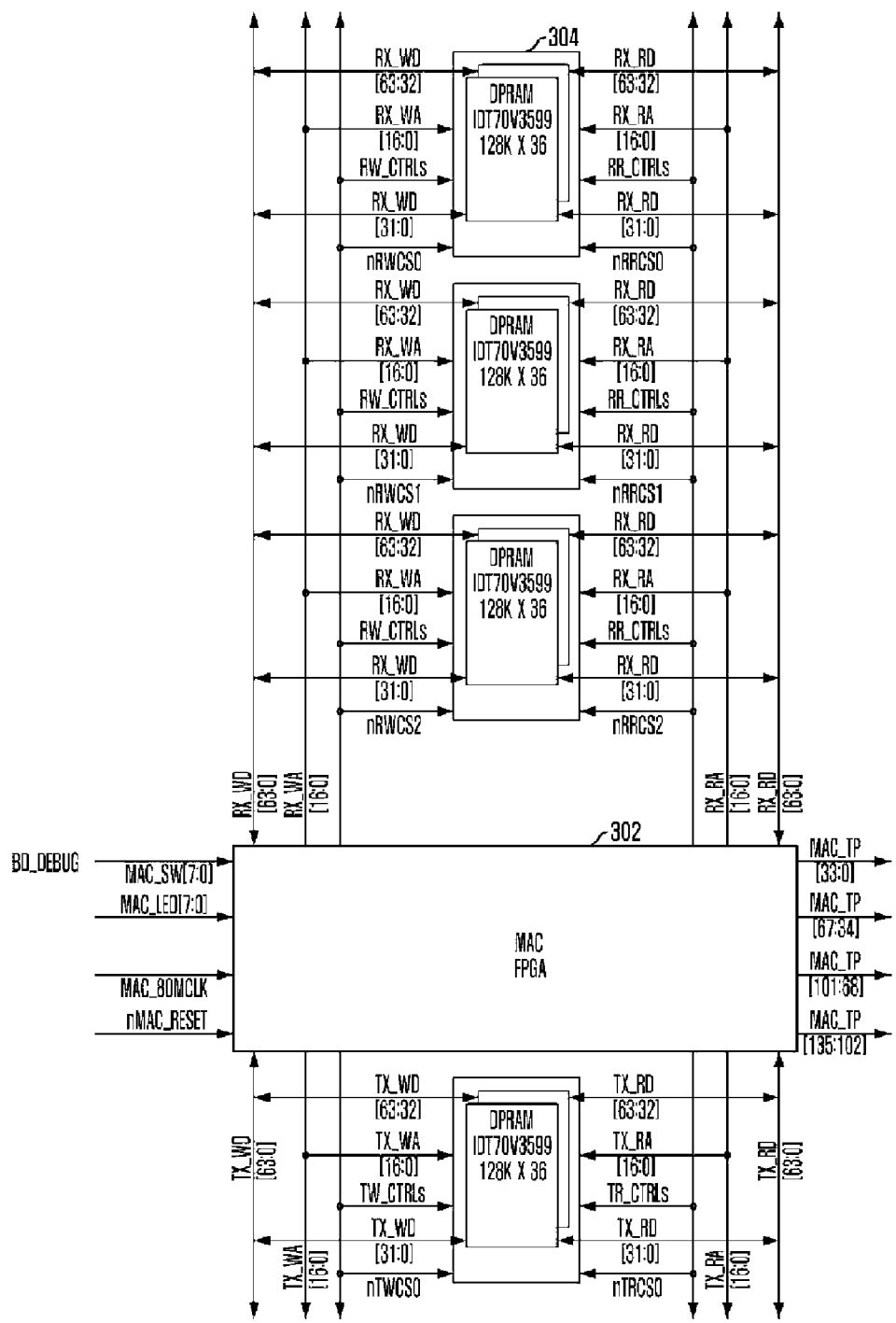

FIGS. 4 and 5 are diagrams illustrating an interface between a MAC FPGA 302 and a DPRAM 304 in accordance with an embodiment of the present invention. FIG. 6 is a diagram illustrating an interface between a MAC FPGA 302 and an Internet interface 303 in accordance with an embodiment of the present invention.

The MAC FPGA 302 uses a MICTOR connector 402 as a debug port. The DPRAM 304 has a size of 128K×6 and includes a receiving (Rx) DPRAM port A, a receiving (Rx) DPRAM port B, a transmitting (Tx) DPRAM port A, and a transmitting (Tx) DPRAM port B, which are connected to the MAC FPGA 302 through 64-bit data buses. A control signal connected to each port of the DPRAM 304 is generated by the MAC FPGA 302. A clock used in the DPRAM 304 is provided from an external clock provider 401.

FIG. 6 illustrates an interface between an MAC FPGA 302 and an Ethernet interface 303 in accordance with an embodiment of the present invention. In order to control the MAC FPGA 302 and the Ethernet interface 303, a local CPU interface (CPU_I/F) is provided.

In the transmitting operation, packets received through the Ethernet interface 303 are processed by the MAC FPGA 302, and the processed packets are transferred to three transmission processing modules TX FPGA #0 to #2 305a to 305c. The packets processed by the three transmission processing modules 305a to 305c are transferred to a digital intermediate frequency transmission board DIF-TX through three super high speed transmission modules (Serializer module) 306a to 306c. Here, the DIF-TX boards are equivalent to the DIF transmitter 3 of FIG. 1. The TX FPGAs 305a to 305c and the serializer modules 306a to 306c are equivalent to the physical layer processor 13 of FIG. 1. The operation of the transmission processing module is identical to that of the physical layer processor described in FIG. 1.

The receiving buffer 301, the MAC controller 302, the transmission processing modules 305a to 305c may be realized as a Field Programmable Gate Array (FPGA). Also, the Ethernet interface in the board is connected to a control board (CTRL Board) through a Back Plane Ethernet Interface. A central processing unit (CPU) 307 controls an overall operation of the master board. The CPU 307 is connected to the transmission processing modules 305a to 305c, the MAC controller 302, the receiving buffer 301, and the Ethernet interface 303 through a local bus interface. Also, the CPU 307 transmits and receives a control signal through a back plane, a front port, and a 10/100M Ethernet interface.

FIGS. 7 and 8 are diagrams illustrating an interface structure between the MAC controller (MAC FPGA) 302 and the transmission processing modules (Tx FPGA) 305a to 305c and an interface structure between the transmission processing modules 305a to 305c and the super high speed transmission modules 306a to 306c.

The transmission processing module (Tx FPGA #0) 305a receives data packets to transmit from the MAC controller (MAC FPGA) 302 and transfers the received data packet to the transmission processing module (Tx FPGA #1 and #2) 305b and 305c. The transmission processing module (Tx FPGA #0) and the transmission processing module (Tx FPGA #1) 305a and 305b, and the transmission processing module (Tx FPGA #0) 305a and the transmission processing module (Tx FPGA #2) 305c are connected through 48-bits transmission data bus (Tx Data Bus). Also, each of the transmission processing modules 305a to 305c provides TX_I and TX_Q signals of an own bandwidth to corresponding super high speed transmission modules 306a to 306c. Each of the transmission processing modules 305a to 305c receives a transmission switch signal TX_SW for test/configuration from the master board and a signal TX_LED for test/monitor from the master board. Also, each of the transmission processing modules 305a to 305c is connected to a Mictor connector and outputs a monitor port and a monitor clock of a transmission processing module.

FIG. 9 is a block diagram illustrating a software structure of a master board in accordance with an embodiment of the present invention.

An ARM based Linux is used as an operation for the master board. Also, Linux based device drivers and application programs are used to operate the master board. The software for the master board includes a Linux kernel 2.4, a serial console, a FPGA control device driver, a 10/100 Ethernet device driver, an application program for collecting board state information and statistic information and controlling a board, a FPGA test application program, a high speed Ethernet MAC test application, and a telnet demon.

As shown in FIG. 9, the FPGA control device driver initializes, activates, and controls Field Programmable Gate Arrays (FPGA) of the master board. If the FPGA control device driver is loaded, the FPGAs are initialized. When the board control application invokes a predetermined operation of a FPGA, the corresponding FPGA is activated. Also, the FPGA is controlled as the application program reads data from registers of the FPGA or writes data at the registers of the FPGA. Each of application programs accesses the FPGA control device driver using a system call for controlling the FPGA.

The FPGA test application program is used for debugging and provides a simple interface for testing reading data from and writing data to the registers of the FPGS. The FPGA provides board state information and statistic information and enables the application programs to read the board state information and statistic information. The application programs collect the board state information and statistic information and transfers the collected information to an managing software through a network.

The Ethernet device driver activates an Ethernet port of the master board by controlling a 10/100 Ethernet controller. The high speed Ethernet MAC device driver initializes high speed Ethernet MAC of the master board. The high speed Ethernet MAC application is used to test reading data from and writing data to registers of a MAC chip. The telnet demon allows telnet access from a remote location.

FIG. 10 is a diagram illustrating a baseband receiving board (DML) in accordance with an embodiment of the present invention. FIGS. 11 and 12 are diagrams for describing an interface of a baseband receiving board (DML).

In order to enable the control board and the master board to recognize each of the three baseband receiving boards (DML), an individual identification (ID) is assigned to each of the baseband receiving boards. Each of the baseband receiving boards (DML) is connected to the master board through a back plane, and a transmission speed of the baseband receiving board (DML) is about 1.2 Gbps. Also, the baseband receiving board is connected to the control board through the back plane and the Ethernet interface.

As shown in FIG. 10, the baseband receiving board (DML) includes a digital front end (DFE FPGA) 802, an MIMO detector 804, and a channel decoder (LDPC FPGA) 806. The digital front end 802 receives digital signals of each band and synchronizes the received digital signals with the super high speed receiving module 801. The MIMO detector 804 detects symbols of the output signals of the digital front end 802 through QR decomposition and multidimensional detection. The channel decoder 806 restores data by performing channel decoding on the detected symbols from the MIMO detector 804.

Hereinafter, interfaces and operations of each constituent elements of the baseband receiving board will be described.

Each of the baseband receiving boards (DML) may include one super high speed receiving module 801, and the super high speed receiving module 801 is connected to the digital front end (DFE FPGA) 802 through a MICTOR connector. The output signal of the super high speed receiving module 801 is formed in 228-bits and transmitted after synchronized at a 40 MHz clock.

The digital front end (DFE FPGA) 802 transforms a frequency domain signal to a time domain signal through FFT and transmits I-FFT output signal Ant [#0~#7] and a Q-FFT output signal to the MIMO detector (MIMO1 FPGA) 804. The digital front end (DFE FPGA) 802 exchanges control signals such as Enable, MCS and Length, and Contents data with the MIMO1 FPGA 804. Also, the digital front end (DFE FPGA) 802 transfers an MIMO1 FPGA NSSY (Number of Sampler Per Symbol) signal to the MIMO1 FPGA 804. Also, the digital front end (DFE FPGA) 802 exchanges controls signals such as Enable, MCS and Length, and contents data with an MIMO2 FPGA 805 and transfers an MIMO2 FPGA NSSY (Number of Sampler Per Symbol) signal to the MIMO2 FPGA 805.

Furthermore, the digital front end (DFE FPGA) 802 transfers a row split signal for Wight Zero Forcing (WZF) and a modulation signal for weight zero forcing to a LDPC FPGA 806 which is each of channel decoders. The digital front end (DFE FPGA) 802 is connected to a local CP 803 and exchanges signals for monitoring and confirming state information with the local CPU 803.

The MIMO1 FPGA 804, which is the MIMO detector, outputs a Log Likelihood Ratio (LLR) signal to each LDPC FPGA 806, wherein the LLR signal is obtained through performing QR decomposition and multidimensional detection on the output signal of the DFE FPGA 802.

The channel decoder may be embodied with four LDPC FPGAs 806, which are LDPC1 FPGA, LDPC2 FPGA, LDPC3 FPGA, and LDPC4 FPGA. The LDPC1 FPGA receives LLR0 and LLR1 from the MIMO1 FPGA 804, and the LDPC2 FPGA receives LLR2 and LLR3 from the MIMO1 FPGA 804. Also, the LDPC3 FPGA receives LLR4 and LLR5 from the MIMO1 FPGA 804, and the LDPC4 FPGA receives LLR6 and LLR7 from the MIMO1 FPGA 804. Data decoded by each of the LDPC FPGAs is transferred to the master board through the backplane at a transmission speed of 1.2 Gbps. In other word, each of the LDPC FPGAs transmits decoded 48-bit signals (Ldpcobo00[5:0], Ldpcobo01[5:01], Ldpcobo02[5:01], Ldpcobo03[5:01], Ldpcobo04[5:01], Ldpcobo05[5:01], Ldpcobo06[5:01], and Ldpcobo07[5:0]) to the master board through the backplane.

FIG. 13 is a diagram illustrating software driven on a baseband receiving board (DML) in accordance with an embodiment of the present invention. The baseband receiving board is driven by an ARM based Linux operating system with a Linux base device driver and application programs. The software includes a Linux Kernel 2.4, a serial console, a FPGA control device driver, an application program for collecting RF receiving information and board state information and controlling a board, a FPGA test application program, a 10/100 Ethernet device driver, and a telnet demon.

The FPGA control device driver initializes, activates, and controls FPGAs of the baseband receiving board. If the FPGA control device driver is loaded, the FPGA is initialized. If the board control application program instructs a FPGA to perform a predetermined operation, the FPGA becomes activated. The board control application program controls a FPGA by reading data from and writing data to registers of the FPGA.

The FPGA test application program is used for debugging and provides a simple interface for testing reading data from and writing data to the registers of the FPGA. The FPGA provides board state information, static information, and RF receiving related information and allows the application programs to read the provided information. The application programs collect the provided information and transfers the collected information to manager software.

The Ethernet device driver activates an Ethernet port of a board by controlling the 10/100 Ethernet controller. The telnet demon allows telnet access from a remote location.

FIG. 14 is a diagram illustrating a control board in accordance with an embodiment of the present invention.

The control board is connected to a digital intermediate receiving board (DIF-RX), a digital intermediate frequency transmitting board (DIF-TX), the baseband receiving boards, the Ethernet interface of the master board through a backplane. The control board includes an Ethernet switch and provides an Ethernet interface of each board.

A slot information collection logic (FPGA (CPLD)) 1101 receives signals having information on the attachment and detachment of each of connected slot boards through the backplane. A 10/100M Ethernet switch 1102 switches Ethernet interfaces of each board and is connected to a local CPU 1103. The local CPU 1103 is connected to a front Ethernet port (RJ45).

Clocks (40 MHz) distributed by a clock distribution logic 1105 are provided each of slots through the backplane, and a LED display logic 1104 is a block for transferring state information of a system to a front LED display board. A CPU 1103 used in the control board has two Ethernet ports and a local CPU bus.

FIG. 15 is a diagram illustrating software of a control board in accordance with an embodiment of the present invention. The control board is driven by an ARM based Linux operating system with a Linux based device driver and application programs. The software includes a Linux Kernel 2.4, a serial console, a FPGA control device driver, an application program for collecting board state information, board attachment/detachment information, and controlling a board, a FPGA test application program, an Ethernet switch control device driver, an 10/100 Ethernet device driver, a telnet demon, and an Ethernet switch test application program.

The FPGA control device driver initializes, activates, and controls FPGAs of the control board. If the FPGA control device driver is loaded, the FPGAs are initialized. If the board control application program instructs a FPGA to perform a predetermined operation, the FPGA is activated. The board control application program controls the FPGAs by reading data from and writing data to registers of the FPGAs.

The FPGA test application program is used for debugging and provides a simple interface for testing reading data from and writing data to the registers of the FPGA. The FPGA provides board state information and attachment/detachment information of each board, and the application program can read the provided board state information and attachment/detachment information.

The application program collects the board state information and attachment/detachment information of each board and transfers the collected information to manager software through a network. The Ethernet device driver activates Ethernet ports of the control board by controlling the 10/100 Ethernet controller. The Ethernet switch device driver activates the Ethernet switch of the control board.

The manager software is driven on the Windows XP operating system. The manager software controls and monitors each board. The manager software performs a function of monitoring statistic information and state information received from the baseband receiving board (DML), a function of controlling the baseband receiving board (DML), the master board, and the control board, a function of displaying a RF constellation as a graph, and a function of providing a user interface.

The manager software is connected to the application programs of each board through sockets, and transmits and receives statistic information, state information, and control information to/from the application programs of each board. The manager software displays the information received from the boards through the user interface (UI). Particularly, the RF related information is displayed as constellation. The manager software provides the user interface (UI) to control each of the boards. That is, the manager software enables a user to control each of the boards by displaying the details of each board to control.

Since the high-throughput wireless communication system according to the present embodiment includes a plurality of modules, the high-throughput wireless communication system according to the present embodiment includes an additional shelf for housing the plurality of modules and providing a high speed interface among the plurality of modules.

The shelf has a 9-slot structure for housing the three baseband receiving boards (DML), the master board, the control board, the digital intermediate frequency transmitting/receiving boards (DIF_RX and DIF_TX), and the RF board.

A width of each slot is about 9 HP (45.72 mm), and a height of each slot is about 10 U (444.5 mm). Therefore, the shelf provides an enough space for housing comparatively tall and wide boards.

The boards are mounted at the front side of the shelf, and the backplane is provided for connecting interfaces of each board and for applying power. A Rear Transition Module (RTM) space is provided behind of the backplane.

An external −48V/2 KW power supply provides power to a power supply of the shelf. The power supply generates −48V DC power by internally processing 220V power from the outside and supplies the −48V DC power to the shelf through a cable. The backplane smoothly supports high speed interfaces among the modules. The backplane has a thickness thicker than about 3T, and the power is dualized and applied as −48V A, −48V B, VRTN(Voltage return) A, and VRTN (Voltage return) B.

FIG. 16 is a diagram for describing signal transmission between a physical layer processor of a baseband transmitting side and a digital intermediate frequency (DIF) transmission board in accordance with an embodiment of the present invention, and FIG. 17 is a diagram for describing signal transmission between a digital intermediate frequency (DIF) receiving board and a baseband receiving board in accordance with an embodiment of the present invention.

The high-throughput wireless communication system according to the present embodiment is designed to provide a signal as a low clock in a digital intermediate frequency (DIF) unit by dividing a band into n bands if m transmission antennas and m reception antennas are used. For example, a high-throughput wireless communication system according to the present invention may be designed to have eight transmission antennas and eight receiving antennas for high speed data transmission and has a bandwidth of 120 MHz. In this case, m is 8 and n is 3. If a DAC uses 12-bits and an ADC uses 14-bits, a transmitter may have a data transmission speed of about 23.04 Gbps (=40 MHz(operation speed)−12 bits−2(I/Q)−3 (bands)−8(the number of antennas)), and a receiver may have a data transmission speed of about 26.88 Gbpas (=40 MHz (operation speed)×14 bit−2(I/Q)×3(bands)×8(the number antennas)). That is, the high-throughput wireless communication system according to the present invention may have about 8.96 Gbps transmission speed per each band.

Referring to FIG. 16, a physical layer processor at a baseband transmitting side receives m channel I and Q data having low operation frequency such as 40 MHz from a MAC layer as a Low Voltage Transistor Logic (LVTTL) and transmits the received m channel I and Q data to the high speed receiving module 1301 of the DIF transmitting board through n super high speed transmission modules 1301 which are equipped by each band. Each of m channel processors processes signals of each band from n high speed receiving modules 1302 through combination, complex number modulation, and gain control, and outputs the processed signals through the DAC. That is, each of the channel processors 1303 combines three band signals into a 120 MHz signal through 1:8 multiphase filter and mixer and outputs the combined signal to the DAC.

Referring to FIG. 17, a digital signal inputted through the ADC is inputted to each of m channel processors 1401. Each of the channel processors 1401 processes the input signal through filtering, modulation, and gain control per each channel and transfers the processed signal to n super high speed transmission modules 1402. That is, each of the channel processors 1401 receives a zero intermediate frequency (Zero IF) three band signal from the ADC, decomposes the Zero IF three band signal into 40 MHz band signals using a mixer and a filter, and transfers the divided 40 MHz band signals to n super high speed transmission modules 1402. Each of n super high speed transmission modules 1402 divides an entire transmission band signal from the m channel processors 1401 into signals of each band and transfers the divided signals to the n high speed receiving modules 1403 of a baseband receiver.

The method of the present invention described above may be programmed for a computer. Codes and code segments constituting the computer program may be easily inferred by a computer programmer of ordinary skill in the art to which the present invention pertains. The computer program may be stored in a computer-readable recording medium, i.e., data storage, and it may be read and executed by a computer to realize the method of the present invention. The recording medium includes all types of computer-readable recording media.

The present application contains subject matter related to Korean Patent Application Nos. 2007-0131835 and 2008-0079630, filed in the Korean Intellectual Property Office on Dec. 15, 2007, and Aug. 13, 2008, the entire contents of which is incorporated herein by reference.

While the present invention has been described with respect to the specific embodiments, it will be apparent to those skilled in the art that various changes and modifications may be made without departing from the spirit and scope of the invention as defined in the following claims.

The invention claimed is:

1. A transmitting apparatus of a high-throughput wireless communication system using multiple antennas, the transmitting apparatus comprising:

a baseband transmitter configured to perform a medium access control (MAC) protocol process on transmission signals and reception signals and process the transmission signals by dividing an entire transmission band into n bands in a physical layer process of transmission data, where n is a natural number;

a digital intermediate frequency (DIF) transmitter configured to combine the transmission signals of n bands from the baseband transmitter and output m channel signals corresponding to a number of transmission antennas, where m is a natural number; and a radio frequency (RF) transmitter configured to modulate each of the m channel signals transferred from the DIF transmitter and transmit the modulated signals through m transmission antennas, wherein the baseband transmitter includes:

a receiving buffer configured to temporarily store received data;

a medium access control (MAC) processor configured to transfer the buffered data from the receiving buffer to an external device through an Ethernet interface by processing the buffered data through the MAC protocol process;

a plurality of physical layer processors configured to perform the physical layer process by dividing transmission packet data transferred from the MAC processor by a predetermined band; and a plurality of first super high speed transmitting units corresponding to the plurality of physical layer processors in a one-to-one manner and configured to transfer the transmission signals of each band to the DIF transmitter.

2. The transmitting apparatus of claim 1, further comprising a first local central processing unit (CPU) configured to control the receiving buffer, the MAC processor, the plurality of physical layer processors, and the Ethernet interface.

3. The transmitting apparatus of claim 2, wherein the receiving buffer and the first local CPU are coupled to a backplane.

4. The transmitting apparatus of claim 1, wherein the DIF transmitter includes:
- a plurality of first super high speed receiving units configured to receive the transmission signals of each band transferred through the plurality of first super high speed transmitting units;
- a plurality of first channel processors configured to combine the transmission signals of each band transferred through the plurality of first super high speed receiving units and process the combined signals through complex number modulation and gain control to output the m channel signals; and
- a digital to analog converter configured to convert each of the m channel signals outputted from the plurality of first channel processors into analog signals and output the analog signals.

5. A receiving apparatus of a high-throughput wireless communication system using multiple antennas, the receiving apparatus comprising:
- a radio frequency (RF) receiver configured to down-convert RF signals received through a plurality of antennas to output m channel signals corresponding to a number of transmission antennas;
- a digital intermediate frequency (DIF) receiver configured to divide the m channel signals of an entire band inputted from the RF receiver into baseband signals of n bands and output the baseband signals of n bands; and
- a plurality of baseband receivers configured to receive the baseband signals of n bands from the DIF receiver and restore data through a physical layer process, multiple signal detection, and channel decoding, wherein each of the plurality of baseband receivers includes:
- a second high speed receiving unit configured to receive baseband signals of each band, which are transmitted from the DIF receiver;
- a digital front end configured to perform synchronization and signal restoration on the baseband signals of each band inputted through the second high speed receiving unit;
- a symbol detector configured to detect symbols of the baseband signals of each band through QR decomposition and multidimensional detection; and
- a plurality of channel decoders configured to restore the data by performing channel decoding on the detected symbols from the symbol detector.

6. The receiving apparatus of claim 5, further comprising a second local central processing unit (CPU) coupled to the digital front end and configured to control predetermined operations.

7. The receiving apparatus of claim 6, wherein the plurality of channel decoders are coupled to a backplane.

8. The receiving apparatus of claim 5, wherein the DIF receiver includes:
- an analog to digital converter configured to convert analog signals of each channel inputted from the RF receiver into digital signals;
- a plurality of second channel processors configured to divide the digital signals of each channel by n bands and output divided digital signals of n bands; and
- a second high speed transmitting unit configured to output the divided digital signals of n bands inputted from the plurality of second channel processors to the second high speed receiving unit as the baseband signals of n bands through a high speed interface.

* * * * *